United States Patent
Sudo

(10) Patent No.: US 10,278,086 B2
(45) Date of Patent: Apr. 30, 2019

(54) BASE STATION

(71) Applicant: PANASONIC CORPORATION, Osaka (JP)

(72) Inventor: Hiroaki Sudo, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 159 days.

(21) Appl. No.: 15/656,469

(22) Filed: Jul. 21, 2017

(65) Prior Publication Data

US 2017/0325114 A1   Nov. 9, 2017

Related U.S. Application Data

(62) Division of application No. 14/808,294, filed on Jul. 24, 2015, now Pat. No. 9,820,174.

(30) Foreign Application Priority Data

Jul. 28, 2014 (JP) .................................. 2014-153012
Jan. 26, 2015 (JP) .................................. 2015-012250

(51) Int. Cl.
*H04L 27/26* (2006.01)
*H04L 5/00* (2006.01)
*H04W 24/02* (2009.01)
*H04W 24/08* (2009.01)
*H04W 88/08* (2009.01)

(52) U.S. Cl.
CPC ........... *H04W 24/08* (2013.01); *H04L 5/0055* (2013.01); *H04L 27/2646* (2013.01); *H04W 24/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2010/0097963 A1* | 4/2010 | Astely | H04W 56/003 370/280 |
| 2013/0136028 A1* | 5/2013 | Gan | H04W 24/02 370/252 |
| 2015/0043395 A1 | 2/2015 | Dai et al. | |

(Continued)

FOREIGN PATENT DOCUMENTS

JP    09-051327    2/1997

*Primary Examiner* — Yaotang Wang
(74) *Attorney, Agent, or Firm* — Greenblum & Bernstein, P.L.C.

(57) ABSTRACT

A base station is provided that performs time-division duplex radio communication with a terminal, using part of a frequency band shared with another system. The base station includes a receiver that receives an uplink signal from the terminal for each frequency band in use, and a guard-time-length setter that sets a length of a guard time. The base station also includes a reception level measurer, which measures a reception level of the uplink signal and a reception level of the guard time having a predetermined length, and a frequency band selector, which selects a frequency band in which the reception level of the guard time is not greater than a first threshold. The base station further includes a control signal generator that generates a control signal, and a transmitter that transmits a downlink signal, including the control signal, to the terminal for the frequency band in use.

2 Claims, 18 Drawing Sheets

(56) References Cited

U.S. PATENT DOCUMENTS

2016/0014746 A1* 1/2016 Ode .................. H04W 72/0453
370/330
2016/0316376 A1* 10/2016 Wen ..................... H04W 16/14

* cited by examiner

| QUALITY INFORMATION | GUARD-TIME-LENGTH INFORMATION | FREQUENCY INFORMATION | Ack/Nack | LINK ADAPTATION INFORMATION | ... |

FIG. 15

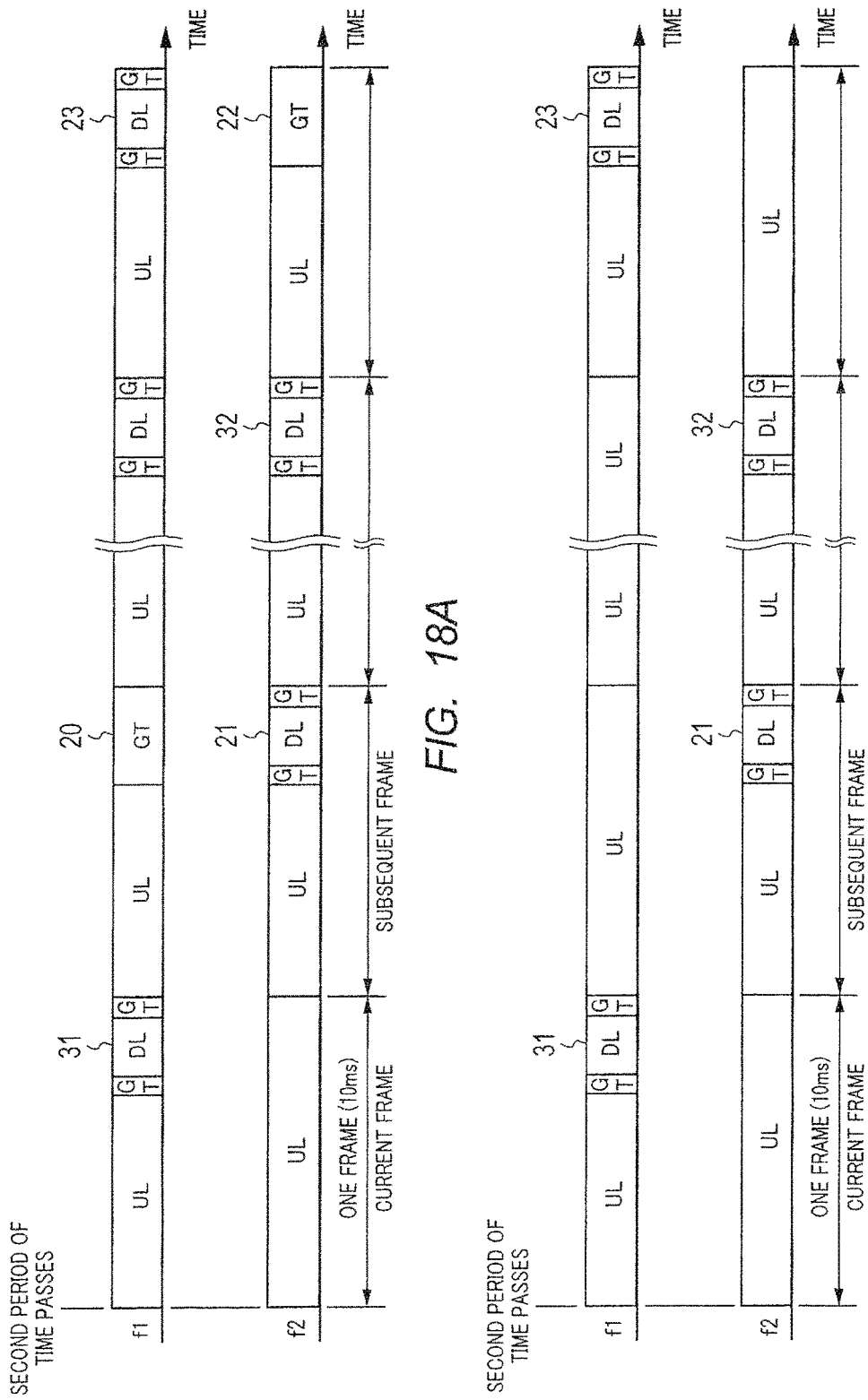

BASE STATION

CROSS REFERENCE TO RELATED APPLICATIONS

This application is a divisional of U.S. application Ser. No. 14/808,294, filed Jul. 24, 2015, which claims priority to Japanese Application Nos. 2015-012250, filed on Jan. 26, 2015 and 2014-153012, filed on Jul. 28, 2014. The disclosures of these documents, including the specifications, drawings, and claims, are incorporated herein by reference in their entirety.

TECHNICAL FIELD

The present invention relates to a base station configured to perform radio communication with a terminal.

BACKGROUND ART

Field pickup units (FPUs) are known as apparatuses used in a radio communication system for video transmission such as live television broadcasting or emergency broadcasting. Such an FPU is used for transmitting materials of a broadcasting sector and configured to transmit an uplink (UL) signal of the main content information from of a scene-reporting-side mobile station (terminal) to a broadcast-station-side base station, while transmitting a downlink (DL) signal of feedback information from the broadcast-station-side base station to the scene-reporting-side mobile station (terminal). The video captured by a camera is sent via file transmission in real time and transmitted from the mobile station to the base station as an UL signal and stored in a storage medium and reproduced. In addition, a feedback signal and control signal are transmitted from the mobile station to the base station as a DL signal.

In such a radio communication system, while the DL signal which is the feedback information from a broadcast-station-side base station to a scene-reporting-side mobile station is necessary, what is desired most is faster transmission of UL signals which are the main content information such as video information used in broadcasting. An increase in the transmission rate of UL signals requires a Time-Division Duplex (TDD) frame configuration in which the UL period is longer than the DL period.

In the TDD system, a guard time is provided between a UL transmission period and a DL transmission period for the purpose of absorbing delay in radio propagation (see Patent Literature (hereinafter, referred to as "PTL") 1. The amount of delay decreases as the distance between the mobile station and the base station decreases. Meanwhile, in order to increase the transmission rate, it is favorable to set the guard time to be as short as possible. For this reason, in the related art, the length of guard time is set to be variable so that the guard time becomes short as the distance between the mobile station and the base station decreases.

In addition, FPUs share a frequency band with another system such as a transceiver, so that the presence or absence of interference in the frequency band in use needs to be always monitored to prevent interference with the other system in FPUs. FPU base stations each measure the reception level (interference amount) of a guard time and determines that the other system has started using the frequency band (interference has occurred) when the reception level exceeds a predetermined threshold, and the base station stops using the frequency band. Note that, the reception level (reception quality) is a received signal strength indicator (RSSI), for example, to be more specific.

CITATION LIST

Patent Literature

PTL 1
Japanese Patent Application Laid-Open No. HEI 9-51327

SUMMARY OF INVENTION

Technical Problem

In the related art, however, a short guard time is set when the distance between the terminal and base station is short, so that a sufficient amount of time for measuring the reception level cannot be secured, which leads to a problem in that frequency sensing accuracy deteriorates.

An object of the present invention is thus to provide a base station capable of performing sensing of a frequency with high accuracy by securing a sufficient amount of time to measure a reception level of a guard time while avoiding a decrease in the transmission rate as much as possible, even when the distance between a terminal and the base station is short.

Solution to Problem

A base station according to an aspect of the present invention is a base station configured to perform time-division duplex radio communication with a terminal, using part of a frequency band shared with another system, the base station including: a receiving section that receives an uplink signal from the terminal for each frequency band in use; a reception level measurement section that measures a reception level of the uplink signal and a reception level of a guard time for the frequency band in use; a guard-time-length setting section that sets a length of the guard time based on the reception level of the uplink signal; a frequency band selection section that selects a frequency band in which the reception level of the guard time is not greater than a first threshold; an Ack/Nack generation section that generates an Ack/Nack for the frequency hand in use, based on an error detection result of the received uplink signal; a control signal generation section that generates, for the frequency band in use, a control signal including information indicating the set length of the guard time, information indicating the selected frequency band, and an Ack/Nack; and a transmission section that transmits a downlink signal including the control signal to the terminal for the frequency band in use, in which, when not generating the control signal in a first frequency band, the control signal generation section adds information including an Ack/Nack for the first frequency band in the control signal in a second frequency band that is different from the first frequency band, and the transmission section does not transmit the down link signal when the control signal generation section does not generate the control signal in the first frequency band.

Advantageous Effects of Invention

According to the present invention, sensing of a frequency can be performed with high accuracy with a transmission rate almost identical to the conventional transmission rate, even when the distance between a terminal and a base station is short.

BRIEF DESCRIPTION OF DRAWINGS

FIG. 15 is a diagram illustrating a configuration example of a control signal according to Embodiment 4 of the present invention;

FIGS. 18A and 18B are each a diagram illustrating an example of a frame configuration according to Embodiment 4 of the present invention.

DESCRIPTION OF EMBODIMENTS

Hereinafter, a detailed description will be given of embodiments of the present invention with reference to the drawings.

Embodiment 1

Figure 1:
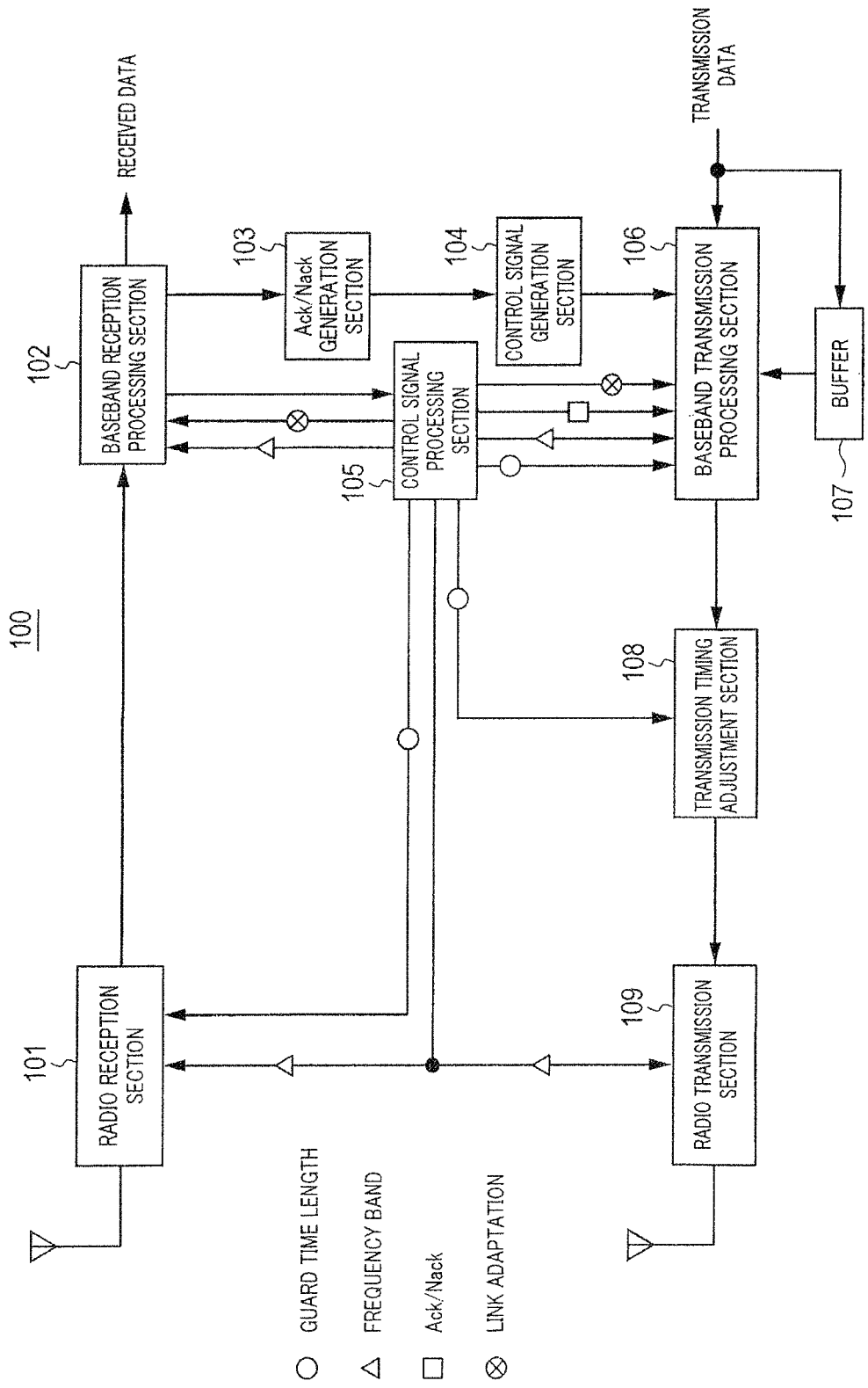
FIG. 1 is a block diagram illustrating a configuration example of a terminal according to Embodiment 1 of the present invention.
Figure 2:
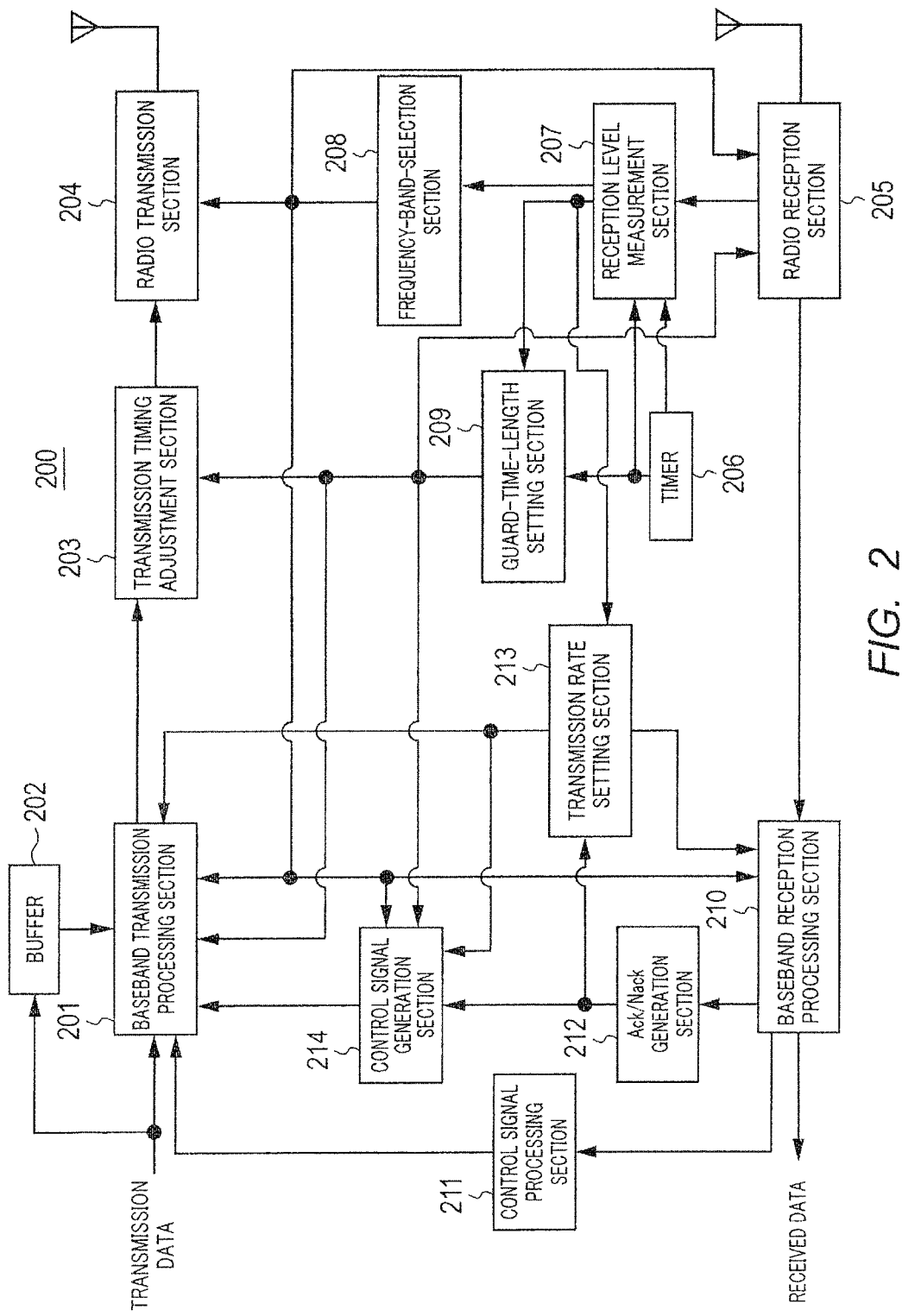
FIG. 2 is a block diagram illustrating a configuration example of a base station according to Embodiment 1 of the present invention.

A radio communication system according to Embodiment 1 includes terminal 100 illustrated in FIG. 1 and base station 200 illustrated in FIG. 2. Terminal 100 and base station 200 are each an FPU used in transmission of materials in a broadcasting sector, for example. More specifically, terminal 100 transmits video information or the like to base station 200 as a UL signal, and base station 200 transmits feedback information or the like to terminal 100 as a DL signal.

To begin with, a description will be given of a configuration example of terminal 100 according to Embodiment 1 with reference to FIG. 1. FIG. 1 is a block diagram illustrating a configuration example of terminal 100 according to Embodiment 1.

In FIG. 1, terminal 100 mainly includes radio reception section 101, baseband reception processing section 102, Ack/Nack generation section 103, control signal generation section 104, control signal processing section 105, baseband transmission processing section 106, buffer 107, transmission timing adjustment section 108, and radio transmission section 109. Hereinafter, each section of terminal 100 will be described.

Radio reception section 101 performs radio reception processing such as amplification, filtering, and/or the like on a radio signal received via an antenna. Radio reception section 101 acquires a baseband signal by down-converting a resultant signal of the radio reception processing using a frequency band selected by base station 200 (frequency-band-selection section 208 to be described, hereinafter) while taking synchronization based on the length of a guard time set by base station 200 (guard-time-length setting section 209 to be described, hereinafter). Radio reception section 101 outputs the baseband signal to baseband reception processing section 102.

Baseband reception processing section 102 performs fast Fourier transform (FFT) processing, demodulation and error correction for or error detection based on the transmission rate on the baseband signal received from radio reception section 101. Baseband reception processing section 102 outputs information indicating the result of error detection to Ack/Nack generation section 103.

Moreover, baseband reception processing section 102 performs parallel/serial (P/S) conversion in accordance with the number of frequency bands selected by base station 200 to acquire a control signal and received data. Baseband reception processing section 102 outputs the control signal to control signal processing section 105. Note that, although details will be given hereinafter, this control signal includes information indicating the length of a guard time (hereinafter, referred to as "guard-time-length information"), information indicating a frequency band (hereinafter, referred to as "frequency information"), Ack/Nack, and link adaptation information and/or the like.

Ack/Nack generation section 103 generates an Ack/Nack based on the information indicating the result of error detection received from baseband reception processing section 102. Ack/Nack generation section 103 outputs an Ack/Nack to control signal generation section 104.

Control signal generation section 104 generates a control signal including the Ack/Nack received from Ack/Nack generation section 103 and outputs the control signal to baseband transmission processing section 106.

Control signal processing section 105 outputs the guard-time-length information included in the control signal received from baseband reception processing section 102 to radio reception section 101, baseband transmission processing section 106, and transmission timing adjustment section 108.

Moreover, control signal processing section 105 outputs the frequency information included in the control signal received from baseband reception processing section 102 to radio reception section 101, baseband reception processing section 102, baseband transmission processing section 106, transmission timing adjustment section 108, and radio transmission section 109.

Control signal processing section 105 indicates new transmission or retransmission to baseband transmission processing section 106 for each frequency band based on the Ack/Nack included in the control signal received from baseband reception processing section 102.

Furthermore, control signal processing section 105 outputs link adaptation information included in the control signal received from baseband reception processing section 102 to baseband reception processing section 102 and baseband transmission processing section 106.

Baseband transmission processing section 106 selects new transmission data, or transmission data stored in buffer 107, based on the indication of control signal processing section 105, forms a UL frame by inserting the control signal received from control signal generation section 104 into the selected transmission data, and performs S/P conversion on the UL frame in accordance with the number of frequency bands selected by base station 200. When forming a UL frame, baseband transmission processing section 106 adjusts the length of the frame based on the length of a guard time that is set by base station 200. Baseband transmission processing section 106 acquires a baseband signal by performing error correction coding and modulation based on the transmission rate and inverse fast Fourier transform (IFFT) processing for each UL frame. Baseband transmission processing section 106 outputs the baseband signal (UL signal) to transmission timing adjustment section 108.

Buffer 107 temporarily stores transmission data.

Transmission timing adjustment section 108 adjusts the transmission timing so as to secure the guard time length set by base station 200 for the signal sequence of the baseband signal received from baseband transmission processing section 106 and outputs the baseband signal to radio transmission section 109.

Radio transmission section 109 performs radio transmission processing such as amplification, filtering, and/or the like on the baseband signal received from transmission timing adjustment section 108. Radio transmission section 109 up-converts a resultant signal of the radio transmission processing into the frequency band selected by base station 200 to acquire a radio signal. Radio transmission section 109 transmits the radio signal (UL signal) via an antenna.

The configuration example of terminal 100 according to Embodiment 1 has been described thus far.

Next, a description will be given of a configuration example of base station 200 according to Embodiment 1 with reference to FIG. 2. FIG. 2 is a block diagram illustrating a configuration example of base station 200 according to Embodiment 1.

In FIG. 2, base station 200 mainly includes baseband transmission processing section 201, buffer 202, transmission timing adjustment section 203, radio transmission section 204, radio reception section 205, timer 206, reception level measurement section 207, frequency-band-selection section 208, guard-time-length setting section 209, baseband reception processing section 210, control signal processing section 211, Ack/Nack generation section 212, transmission rate setting section 213, and control signal generation section 214. Hereinafter, each section of base station 200 will be described.

Baseband transmission processing section 201 selects new transmission data, or transmission data stored in buffer 202, based on the indication of control signal processing section 211, forms a DL frame by inserting the control signal generated by control signal generation section 214 into the selected transmission data, and performs S/P conversion on the DL frame in accordance with the number of frequency bands selected by frequency-band-selection station 208. When forming a DL frame, baseband transmission processing section 201 adjusts the length of a frame based on the length of a guard time that is set by guard-time-length setting section 209. Baseband transmission processing section 201 acquires a baseband signal by performing error correction coding and modulation based on the transmission rate and IFFT processing for each DL frame. Baseband transmission processing section 201 outputs the baseband signal (DL signal) to transmission timing adjustment section 203.

Buffer 202 temporarily stores transmission data.

Transmission timing adjustment section 203 adjusts the transmission timing so as to secure the guard time length set by guard-time-length setting section 209 for the signal sequence of the baseband signal received from baseband transmission processing section 201 and outputs the baseband signal to radio transmission section 204.

Radio transmission section 204 performs radio transmission processing such as amplification, filtering, and/or the like on the baseband signal received from transmission timing adjustment section 203. Radio transmission section 204 up-converts a resultant signal of the radio transmission processing into the frequency band selected by frequency-band-selection section 208 to acquire a radio signal. Radio transmission section 204 transmits the radio signal (DL signal) via an antenna.

Radio reception section 205 performs radio reception processing such as amplification, filtering, and/or the like on the radio signal received via an antenna. Radio reception section 205 acquires a baseband signal by down-converting a resultant signal of the radio reception processing using the frequency band selected by frequency-band-selection section 208 while taking synchronization based on the length of a guard time set by guard-time-length setting section 209. Radio reception section 205 outputs the baseband signal to reception level measurement section 207 and baseband reception processing section 210.

Timer 206 is set for a predetermined first period of time (e.g., 10 ms) and a predetermined second period of time (e.g., 10 s), and upon expiration of the first period of time, timer 206 outputs a first expiration signal indicating expiration of the first period of time to reception level measurement section 207, and upon expiration of the second period of time, timer 206 outputs a second expiration signal indicating expiration of the second period of time to reception level measurement section 207 and guard-time-length setting section 209.

Upon reception of the first expiration signal from timer 206, reception level measurement section 207 measures the reception level of the UL signal (received signal). Reception level measurement section 207 outputs the information indicating the measured reception level of the UL signal to guard-time-length setting section 209 and transmission rate setting section 213.

Upon reception of the second expiration signal from timer 206, reception level measurement section 207 measures the reception level of the guard time of the subsequent frame. Reception level measurement section 207 outputs the information indicating the measured reception level of the guard time to frequency-band-selection section 208.

Frequency-band-selection section 208 selects a frequency band in which the reception level of the guard time measured by reception level measurement section 207 is equal to or less than a first threshold. Frequency-band-selection section 208 outputs the frequency information indicating the selected frequency band to radio transmission section 204, radio reception section 205, baseband transmission processing section 201, baseband reception processing section 210, and control signal generation section 214.

Guard-time-length setting section 209 sets the guard time length of the subsequent frame according to whether or not the second expiration signal has been received from timer 206.

In a case where no second expiration signal has been received from timer 206, for example, guard-time-length setting section 209 sets a first length for the guard time length of the subsequent frame based on the information indicating the reception level of the UL signal received from reception level measurement section 207.

Meanwhile, in a case where the second expiration signal has been received from timer 206, for example, guard-time-length setting section 209 sets a second length (predetermined length required for measurement of reception level) for the guard time length of the subsequent frame.

Figure 3:
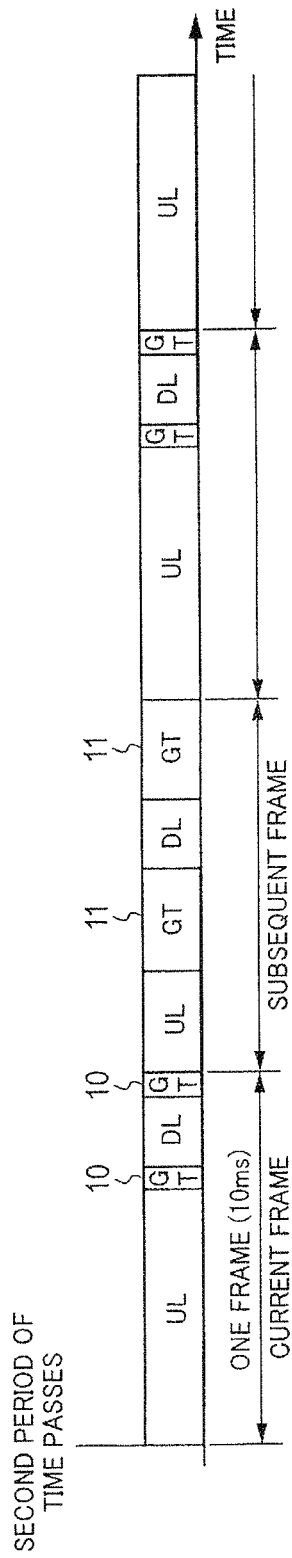
FIG. 3 is an example of a frame configuration according to Embodiment 1 of the present invention.

FIG. 3 illustrates an example of a frame configuration according to Embodiment 1. Note that, the length of one frame is set to 10 ms in the example illustrated in FIG. 3.

In FIG. 3, guard time 10 is a guard time that is set with the first length, while guard time 11 is a guard time that is set with the second length. As illustrated in FIG. 3, even when the distance between the terminal and the base station is short and thus a short guard time is supposed to be set for guard time 10, which is used for the normal period, guard time 11, which is longer than guard time 10 used for the normal period, is set for the frame subsequent to the frame transmitted when the second period of time passes. Note that, when the distance between the terminal and the base station is long, and guard time 10 longer than guard time 11 is set, guard-time-length setting section 209 sets the first length (guard time 10) for the length of the guard time even during measurement of a reception level.

Guard-time-length setting section 209 outputs the guard-time-length information indicating the set length of the guard time to baseband transmission processing section 201, transmission timing adjustment section 203, radio reception section 205, and control signal generation section 214.

Baseband reception processing section 210 performs FFT processing, demodulation and error correction for error detection based on the transmission rate on the baseband signal received from radio reception section 205. Baseband reception processing section 210 outputs information indicating the result of error detection to Ack/Nack generation section 212.

Moreover, baseband reception processing section 210 performs P/S conversion in accordance with the number of frequency bands selected by frequency-band-selection section 208 to acquire a control signal and received data. Baseband reception processing section 210 outputs the control signal to control signal processing section 211.

Control signal processing section 211 indicates new transmission or retransmission to baseband transmission processing section 201 for each frequency band based on the Ack/Nack included in the control signal received from baseband reception processing section 210.

Ack/Nack generation section 212 generates, for each frequency band, an Ack/Nack based on the information indicating the result of error detection received from baseband reception processing section 210. Ack/Nack generation section 212 outputs an Ack/Nack to transmission rate setting section 213 and control signal generation section 214.

Transmission rate setting section 213 sets a transmission rate for each frequency band based on the Ack/Nack received from Ack/Nack generation section 212 and the information indicating the reception level of the UL signal received from reception level measurement section 207. Transmission rate setting section 213 outputs link adaptation information indicating the modulation scheme corresponding to the transmission rate and the coding rate for error correction and/or the like to control signal generation section 214.

Transmission rate setting section 213 indicates the modulation scheme and coding rate and/or the like for the transmission data for each frequency band to baseband transmission processing section 201.

In addition, transmission rate setting section 213 indicates the demodulation scheme and coding rate and/or the like for the baseband signal for each frequency band to baseband reception processing section 210.

Control signal generation section 214 generates a control signal and outputs the control signal to baseband transmission processing section 201. An example of the control signal generated in this processing is illustrated in FIG. 4.

Figure 4:
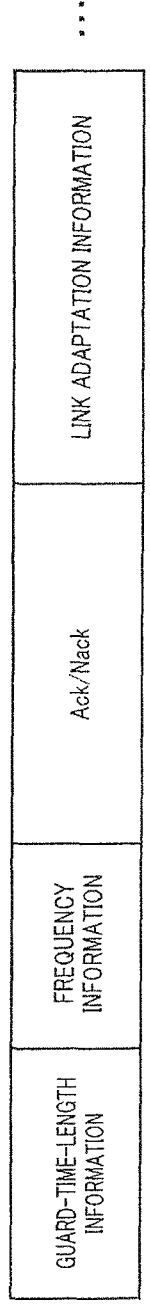
FIG. 4 is a configuration example of a control signal according to Embodiment 1 of the present invention.

In FIG. 4, the guard-time-length information is the information received by control signal generation section 214 from guard-time-length setting section 209 and indicating the first length or the second length. The frequency information is the information received by control signal generation section 214 from frequency-band-selection section 208. The Ack/Nack is the information received by control signal generation section 214 from Ack/Nack generation section 212. The link adaptation information is the information received by control signal generation section 214 from transmission rate setting section 213. Note that, the control signal may include information other than the information illustrated in FIG. 4.

The configuration example of base station 200 according to Embodiment 1 has been described thus far.

Figure 5:
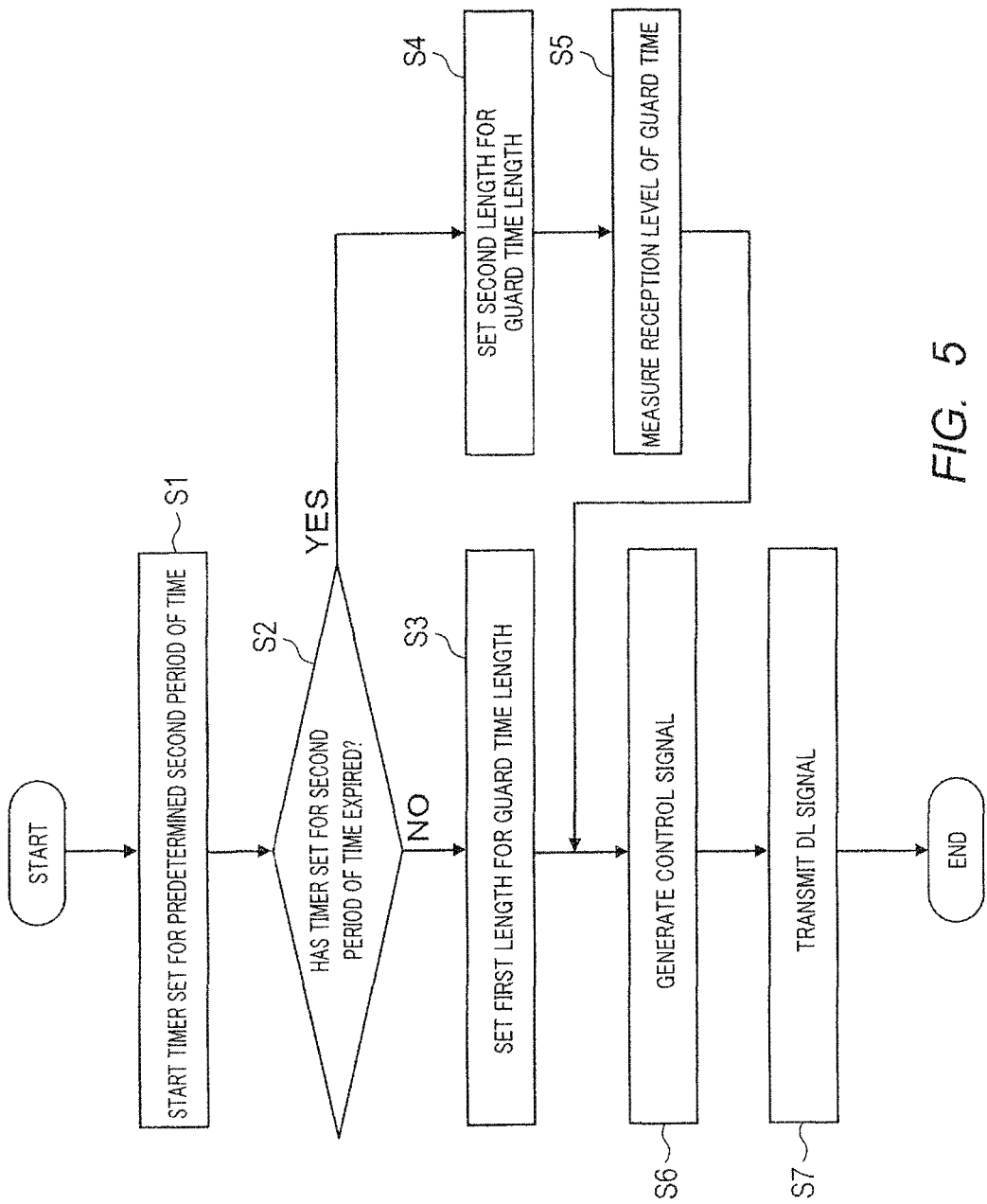
FIG. 5 is a flowchart illustrating an operation example of the base station according to Embodiment 1 of the present invention.

Next, a description will be given of an operation example of base station 200 according to Embodiment 1 with reference to FIG. 5. FIG. 5 is a flowchart illustrating the operation example of base station 200 according to Embodiment 1.

Timer 206 starts for the second period of time (step S1).

When the second period of time set for timer 206 has not expired (step S2: NO), i.e., when it is not time to measure the reception level of a guard time (hereinafter, may be referred to as "normal period"), guard-time-length setting section 209 sets the first length for the length of the guard time for the subsequent frame based on the distance between the terminal and the base station (step S3).

Meanwhile, when the second period of time set for timer 206 has expired (step S2: YES), i.e., when it is time to measure the reception level of a guard time, guard-time-length setting section 209 sets the second length, which is a predetermined length required for measurement of a reception level, for the length of the guard time for the subsequent frame (step S4). Reception level measurement section 207 measures the reception level of the guard time of the frequency band (step S5).

Control signal generation section 214 generates a control signal including the guard-time-length information, frequency information, Ack/Nack, and link adaptation information (step S6).

Radio transmission section 204 transmits a DL signal including the control signal to terminal 100 (step S7).

The operation example of base station 200 according to Embodiment 1 has been described thus far.

As described above, the base station according to Embodiment 1 is characterized in that the base station sets a guard time length so as to secure a predetermined length required for measurement of a reception level when it is time to measure the reception level of the guard time. Thus, even when the distance between the terminal and the base station is short, sensing of a frequency can be performed with high accuracy without a decrease in the transmission efficiency.

Note that, when the length of one frame is 10 ms, and the interval for measuring the reception levels of guard times is 10 s, a long guard time needs to be set only once in every one thousand frames, so that the transmission rate according to Embodiment 1 is almost the same as that of the related art. Embodiment 1 has been described with the case where the length of one frame is 10 ms, and the interval for measuring the reception levels of guard times is 10 s, as an example, but the present invention is not limited to this case, and any value can be set for the length of one frame as well as the interval for measuring the reception levels of guard times.

Embodiment 2

A description will be given of Embodiment 2. The configuration of terminal 100 according to Embodiment 2 is the same as the configuration described in FIG. 1, which is described in Embodiment 1, so that the same description will not be repeated, hereinafter.

Figure 6:
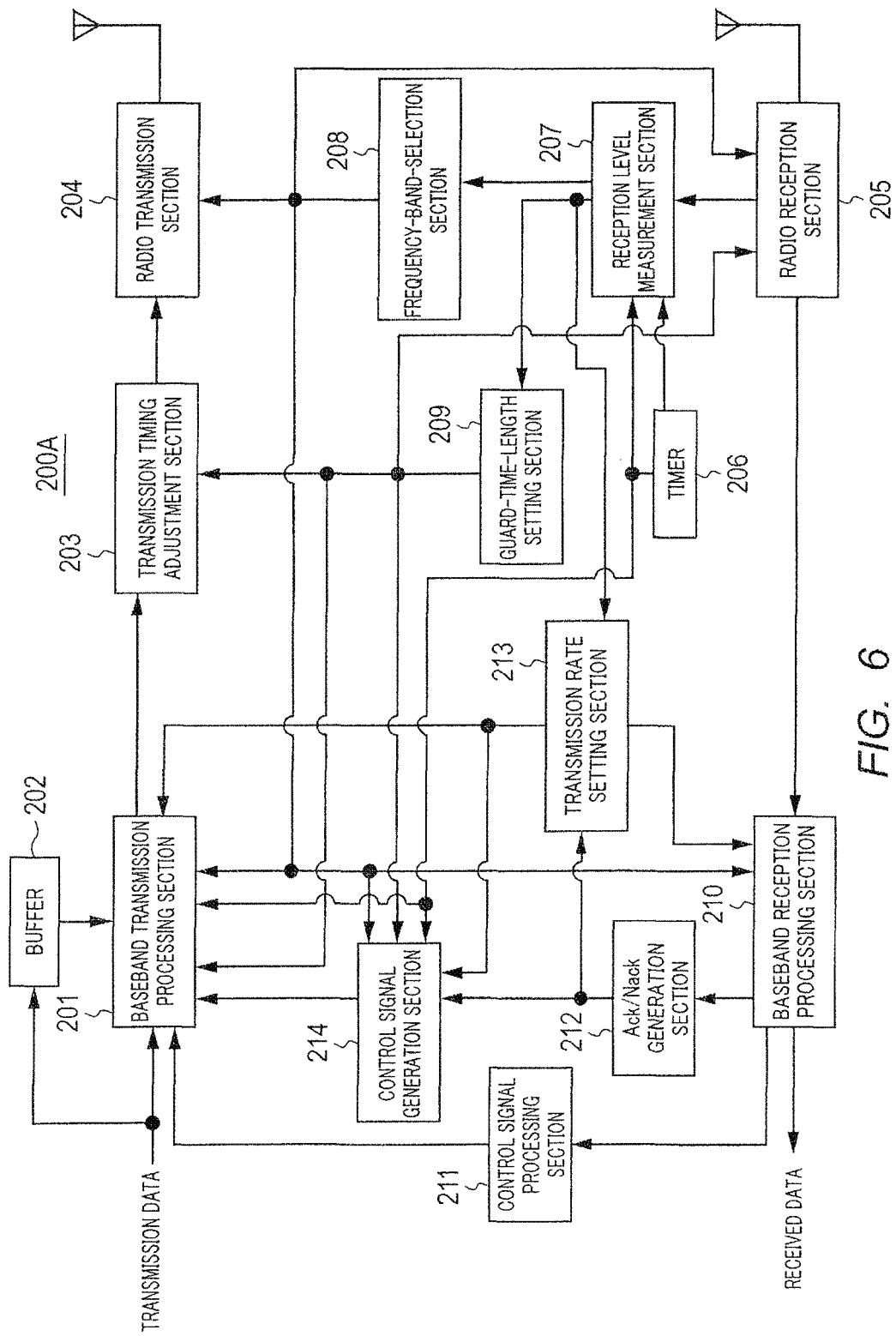
FIG. 6 is a block diagram illustrating a configuration example of a base station according to Embodiment 2.

A description will be given of a configuration example of base station 200A according to Embodiment 2 with reference to FIG. 6. FIG. 6 is a block diagram illustrating the configuration example of base station 200A according to Embodiment 2. Each section of base station 200A illustrated in FIG. 6 is assigned the same reference numeral assigned to the corresponding section of base station 200 illustrated in FIG. 2. Hereinafter, a description will be given of only a configuration element that performs an operation different from the operations in FIG. 2, among the sections illustrated in FIG. 6.

A predetermined first period of time (e.g., 10 ms) and a predetermined second period of time (e.g., 10 s) are set for timer 206, and upon expiration of the first period of time, timer 206 outputs a first expiration signal indicating expiration of the first period of time to reception level measurement section 207, and upon expiration of the second period of time, timer 206 outputs a second expiration signal indicating expiration of the second period of time to baseband transmission processing section 201, reception level measurement section 207, and control signal generation section 214.

Baseband transmission processing section 201 operates as follows, according to whether or not the second expiration signal has been received from timer 206 (i.e., whether or not it is time to measure the reception level of a guard time).

In a case where no second expiration signal has been received from timer 206 (i.e., it is not time to measure the reception level of a guard time), a DL signal is generated by inserting the control signal generated by control signal generation section 214 into transmission data (new transmission or retransmission) to form a DL in all the frequency bands in use. The operation to be performed after the DL signal is generated is the same as that of Embodiment 1, so that the same description will not be repeated hereinafter.

Meanwhile, in a case where a second expiration signal has been received from timer 206 (i.e., it is time to measure the reception level of a guard time), baseband transmission processing section 201 does not generate a DL signal for the subsequent frame in a frequency band (first frequency band) that is a measurement target for the reception level of a guard time (hereinafter, referred to as "measurement target").

Reception level measurement section 207 measures the reception level of a guard time of a received signal in each frequency band every time receiving the second expiration signal from timer 206. Reception level measurement section 207 outputs the information indicating the measured reception level of the guard time to frequency-band-selection section 208.

Control signal generation section 214 operates as follows, according to whether or not the second expiration signal has been received from timer 206 (i.e., whether or not it is time to measure the reception level of a guard time).

In a case where no second expiration signal has been received from timer 206 (i.e., it is not time to measure the reception level of a guard time), control signal generation section 214 generates, in the subsequent frame, a control signal in all the frequency bands in use as in Embodiment 1 and outputs the control signal to baseband transmission processing section 201.

Figure 7:
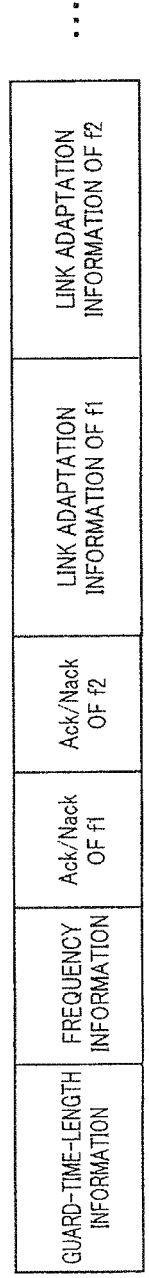
FIG. 7 is a diagram illustrating a configuration example of a control signal according to Embodiment 2.

Meanwhile, in a case where a second expiration signal has been received from timer 206 (i.e., it is time to measure the reception level of a guard time), control signal generation section 214 generates a control signal in the subsequent frame in all the frequency bands except the frequency band of the measurement target and outputs the control signal to baseband transmission processing section 201. However, the guard-time-length information, frequency information, Ack/Nack, and link adaptation information of the frequency band of the measurement target (first frequency band) are included in a control signal of another frequency band (second frequency band) (e.g., a frequency band having the highest reception level). FIG. 7 illustrates an example of this control signal.

As illustrated in FIG. 7, the guard-time-length information, frequency information, Ack/Nack, and link adaptation information of frequency band f1 of the measurement target are included in the control signal of frequency band f2, which is different from first frequency band f1. Upon reception of the second expiration signal from timer 206, baseband transmission processing section 201 forms a DL frame by inserting the control signal illustrated in FIG. 7 into transmission data in the subsequent frame.

Figure 8:
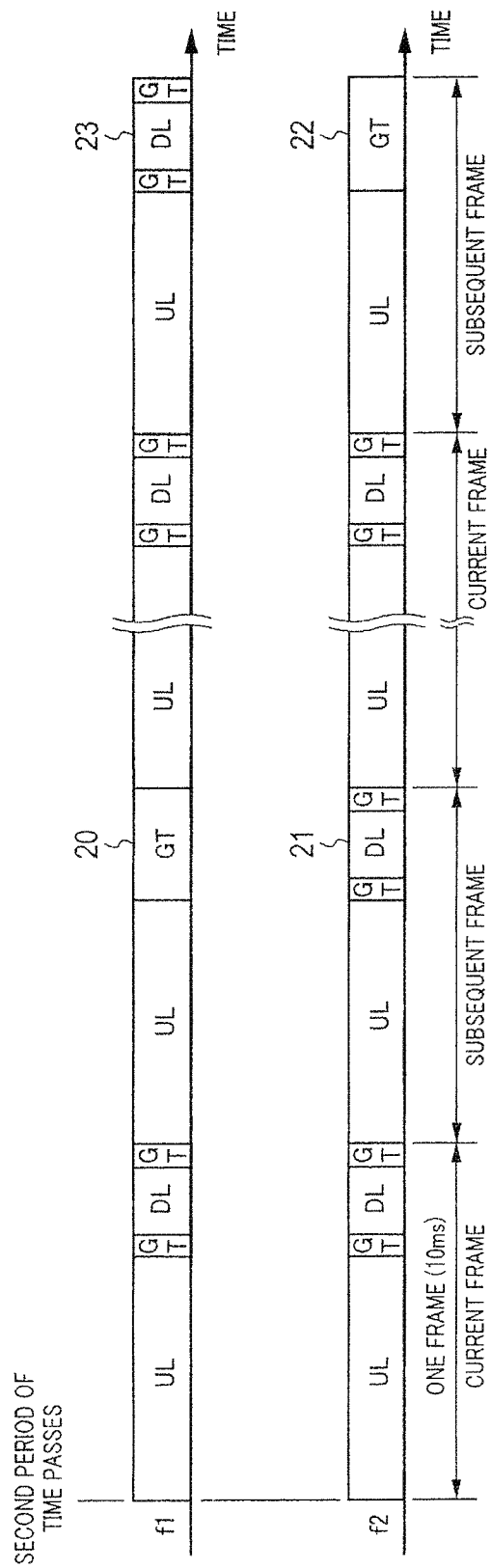
FIG. 8 is an example of a frame configuration according to Embodiment 2 of the present invention.

FIG. 8 illustrates an example of a frame configuration according to Embodiment 2. As illustrated in FIG. 8, no DL signal is transmitted in the frame subsequent to the frame transmitted when the second period of time passes in frequency band f1, which is the measurement target, and the portion of the frame where no DL signal is transmitted becomes guard time 20. Thus, a guard time longer than guard time 10, which is used for the normal period, can be secured. Meanwhile, in frequency band f2, which is different from frequency band f1, DL signal 21 is transmitted in the portion of the frame corresponding to guard time 20.

Note that, when the measurement target frequency band is f2, and another frequency band is f1, no DL signal is transmitted in the frame subsequent to the frame transmitted when the second period of time passes in frequency band f2 of the measurement target, and the portion of the frame where no DL signal is transmitted becomes guard time 22. Meanwhile, in frequency band f1, which is another frequency band, DL signal 23 in the portion of the frame corresponding to guard time 22 is transmitted. Note that, the guard-time-length information, frequency information, Ack/Nack, and link adaptation information in frequency band f2, which is the measurement target, are included in the control signal of DL signal 23.

The configuration example of base station 200A according to Embodiment 2 has been described thus far.

Figure 9:
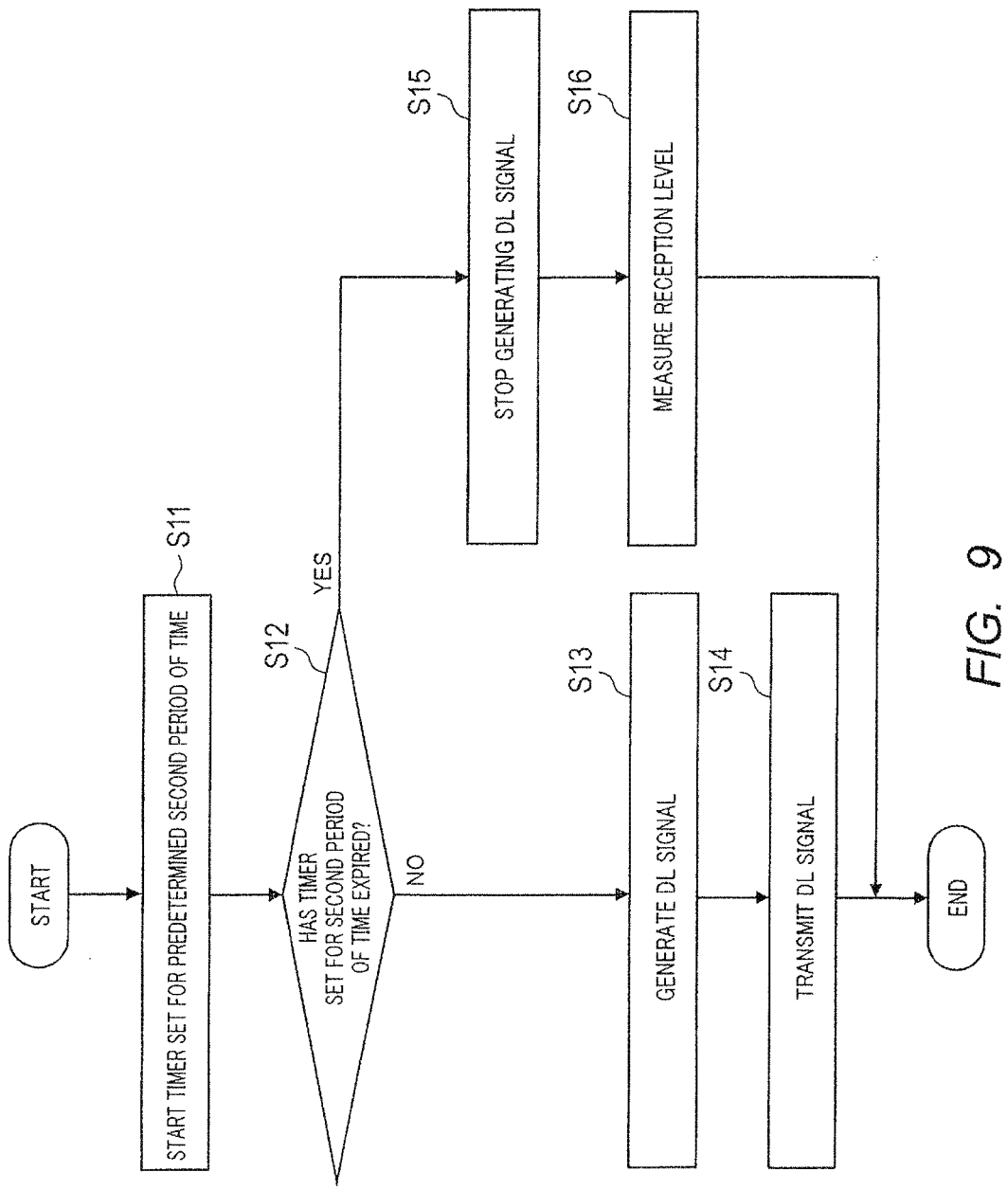
FIG. 9 is a flowchart illustrating an operation example of the base station according to Embodiment 2 of the present invention.

Next, a description will be given of an operation example of base station 200A according to Embodiment 2 with reference to FIG. 9. FIG. 9 is a flowchart illustrating an operation example of base station 200A according to Embodiment 2.

Timer 206 starts for a predetermined second period of time (step S11).

When the second period of time set for timer 206 has not expired (step S12: NO), i.e., when it is not time to measure the reception level of a guard time (during the normal period), baseband transmission processing section 201 generates a DL signal including a control signal (step S13), and radio transmission section 204 transmits the DL signal including the control signal to terminal 100 (step S14).

Meanwhile, when the second period of time set for timer 206 has expired (step S12: YES), i.e., when it is time to measure the reception level of a guard time, baseband transmission processing section 201 stops generating a DL signal in the frequency band (step S15). Reception level measurement section 207 measures the reception level of the guard time of the frequency band (step S16).

The operation example of base station 200A according to Embodiment 2 has been described thus far.

As described above, the base station according to Embodiment 2 is characterized in that the base station secures the period normally allocated for transmission of a DL frame, as a guard time when it is time to measure the reception level of a guard time, and includes information related to the measurement target frequency band (first frequency band) in a control signal of another frequency band (second frequency band). Thus, even when the distance between the terminal and base station is short, sensing of a frequency can be performed with high accuracy without a decrease in the transmission efficiency.

Figure 10:
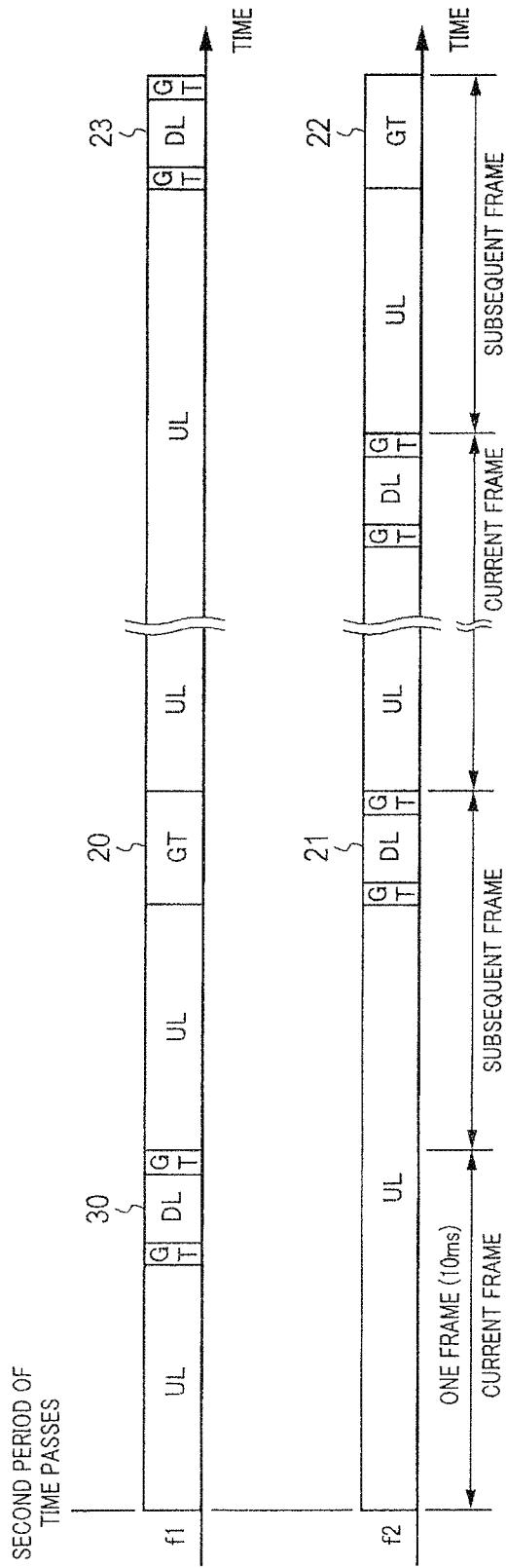
FIG. 10 is an example of a frame configuration according to Embodiment 2 of the present invention.

In Embodiment 2, in a frame in which a DL signal is transmitted in a certain frequency band (second frequency band), a UL signal may be transmitted in another frequency band (first frequency band) in the same frame during a period other than a period in which measurement of a reception level is performed. An example of the frame configuration in this case is illustrated in FIG. 10. As illustrated in FIG. 10, when a DL signal is transmitted in frequency band f1 during a period when it is not time to measure the reception level of a guard time (during the normal period), a UL signal is transmitted in frequency band f2 in the portion of the frame corresponding to the portion of the frame where the DL signal is transmitted in frequency band f1. Note that, it is possible to alternately use frequency bands f1 and f2 for transmitting a DL signal as illustrated in FIG. 10 or to use any one of frequency bands f1 and f2 except for the period when measurement of a reception level is performed.

Embodiment 3

In Embodiment 1, a description has been given of the case where guard-time-length setting section 209 sets the second length (predetermined length required for measurement of a reception level) for the length of a guard time always at the interval of the second periods of time.

In Embodiment 3, a description will be given of a case where the communication quality is estimated in advance, and only when the communication quality deteriorates, guard-time-length setting section 209 sets a second length for the length of the guard time at the timing when the second period of time passes. Note that, the configuration of terminal 100 according to Embodiment 3 is the same as the configuration illustrated in FIG. 1, which is described in Embodiment 1, so that the description of the configuration will not be repeated, hereinafter.

Figure 11:
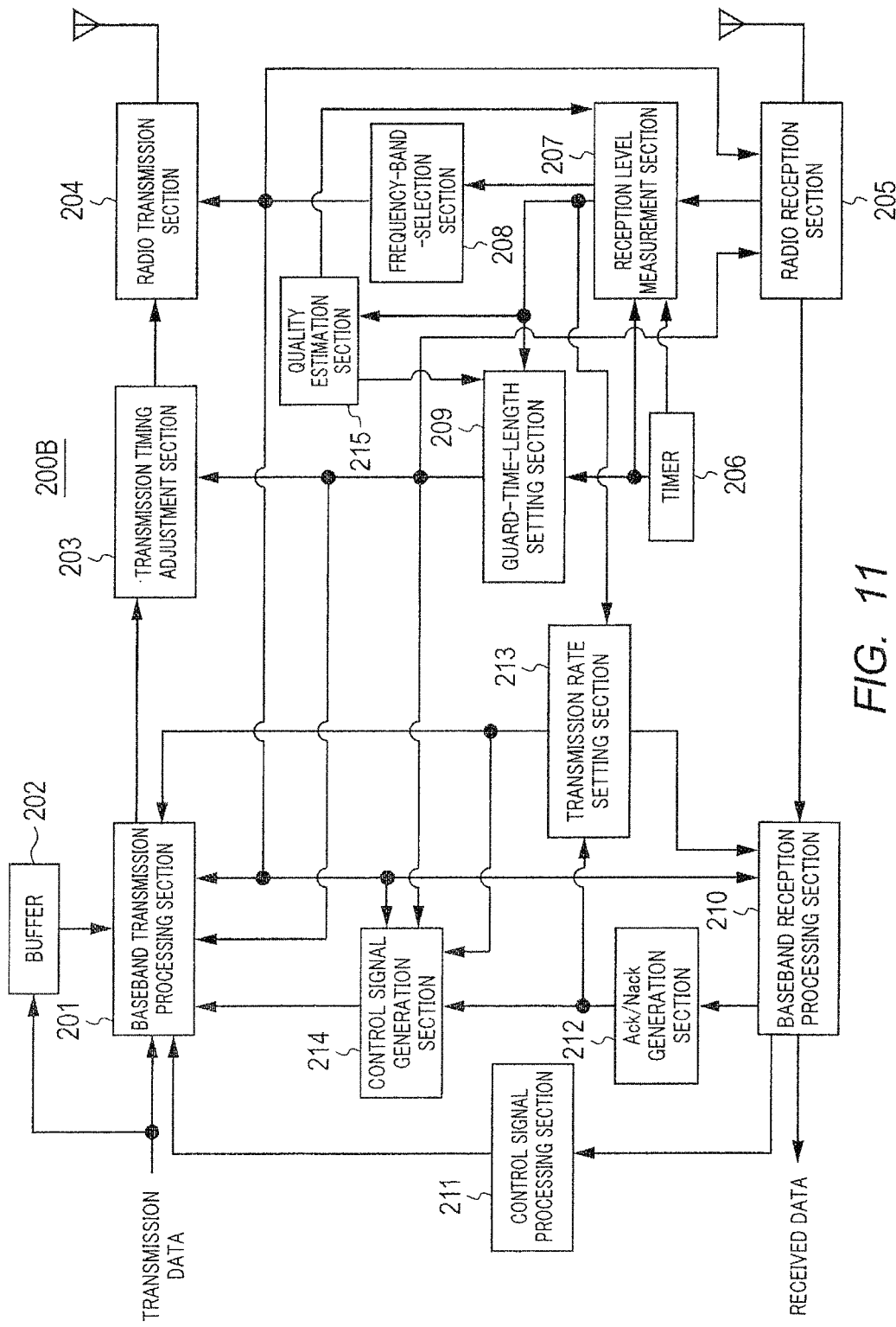
FIG. 11 is a block diagram illustrating a configuration example of a base station according to Embodiment 3 of the present invention.

A description will be given of a configuration example of base station 200B according to Embodiment 3 with reference to FIG. 11. FIG. 11 is a block diagram illustrating the configuration example of base station 200B according to Embodiment 3. Note that, in base station 200B illustrated in FIG. 11, the sections which are common to the sections of base station 200 illustrated in FIG. 2 are assigned the same reference numerals and the detailed descriptions of the sections will not be repeated, hereinafter. Base station 200B illustrated in FIG. 11 employs a configuration which is different from base station 200 illustrated in FIG. 2 in that quality estimation section 215 is added.

Upon reception of the first expiration signal from timer 206, reception level measurement section 207 measures the reception level of a UL signal (received signal). Reception level measurement section 207 outputs the information indicating the measured reception level of the UL signal to guard-time-length setting section 209, transmission rate setting section 213, and quality estimation section 215.

Upon reception of the second expiration signal from timer 206, reception level measurement section 207 measures the reception level of a guard time in the subsequent frame only when the signal outputted from quality estimation section 215 indicates that the communication quality has deteriorated. Reception level measurement section 207 outputs the information indicating the measured reception level of the guard time to frequency-band-selection section 208.

Quality estimation section 215 makes a comparison of a magnitude relationship between the reception level of the UL signal measured by reception level measurement section 207 with a predetermined second threshold. Quality estimation section 215 estimates that the communication quality is favorable when the reception level is greater than the second threshold or estimates that the communication quality has deteriorated when the reception level is not greater than the second threshold. Quality estimation section 215 outputs a signal indicating a result of the estimation to reception level measurement section 207 and guard-time-length setting section 209.

Upon reception of the second expiration signal from timer 206, guard-time-length setting section 209 sets a second length for the length of a guard time in the subsequent frame when the signal outputted from quality estimation section 215 indicates that the communication quality has deteriorated, or guard-time-length setting section 209 sets a first length for the length of a guard time in the subsequent frame when the signal outputted from quality estimation section 215 indicates that the communication quality is favorable based on the information indicating the reception level of the UL signal received from reception level measurement section 207.

Figure 12A:
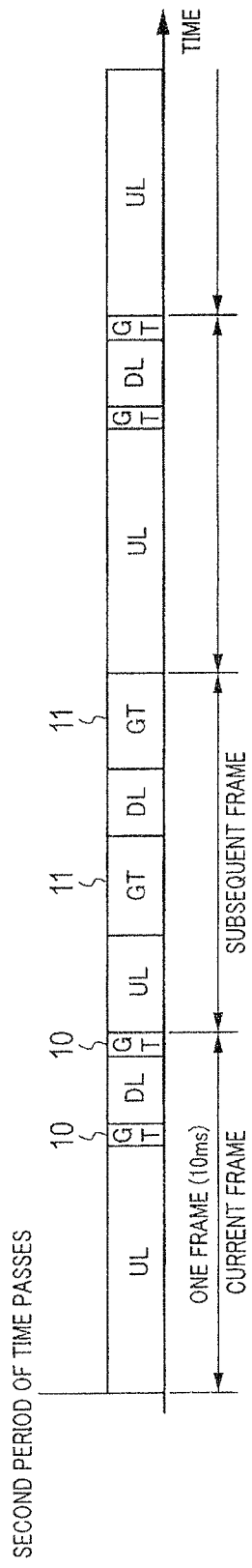
FIGS. 12A and 12B are each an example of a frame configuration according to Embodiment 3 of the present invention.
Figure 12B:
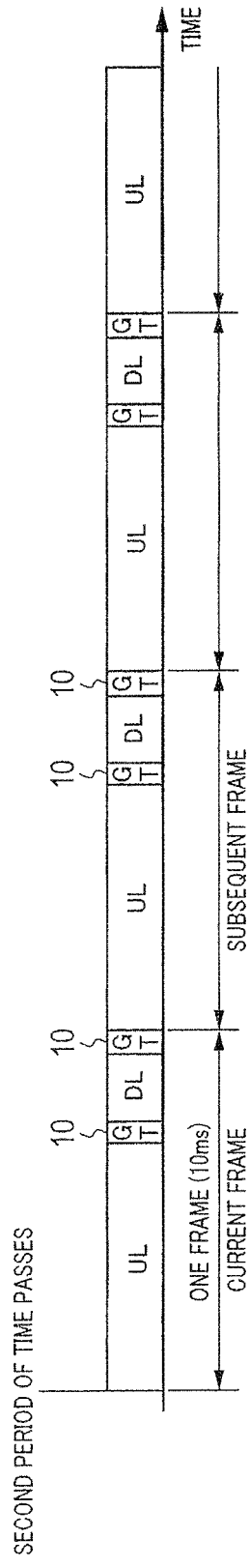

FIGS. 12A and 12B each illustrate an example of a frame configuration according to Embodiment 3. FIG. 12A illustrates a case where the communication quality has deteriorated, while FIG. 12B illustrates a case where the communication quality is favorable. Note that, an assumption is made that the frame length is 10 ms in the examples of FIGS. 12A and 12B.

In FIGS. 12A and 12B, guard time 10 is a guard time that is set with the first length, while guard time 11 is a guard time that is set with the second length. As illustrated in FIG. 12A, in a case where the communication quality has deteriorated, guard time 11, which is longer than guard time 10 used for the normal period, is set in the frame subsequent to the frame transmitted when the second period of time passes.

Meanwhile, as illustrated in FIG. 12B, in a case where the communication quality is favorable, guard time 10 used for the normal period is set in the frame subsequent to the frame transmitted when the second period of time passes. Thus, it is made possible to increase the transmission period for the UL signal, thus making it possible to increase the transmission rate.

Note that, guard-time-length setting section 209 performs the same operation as that in Embodiment 1 in a case where no second expiration signal has been received from timer 206.

The configuration example of base station 200B according to Embodiment 3 has been described thus far.

Figure 13:
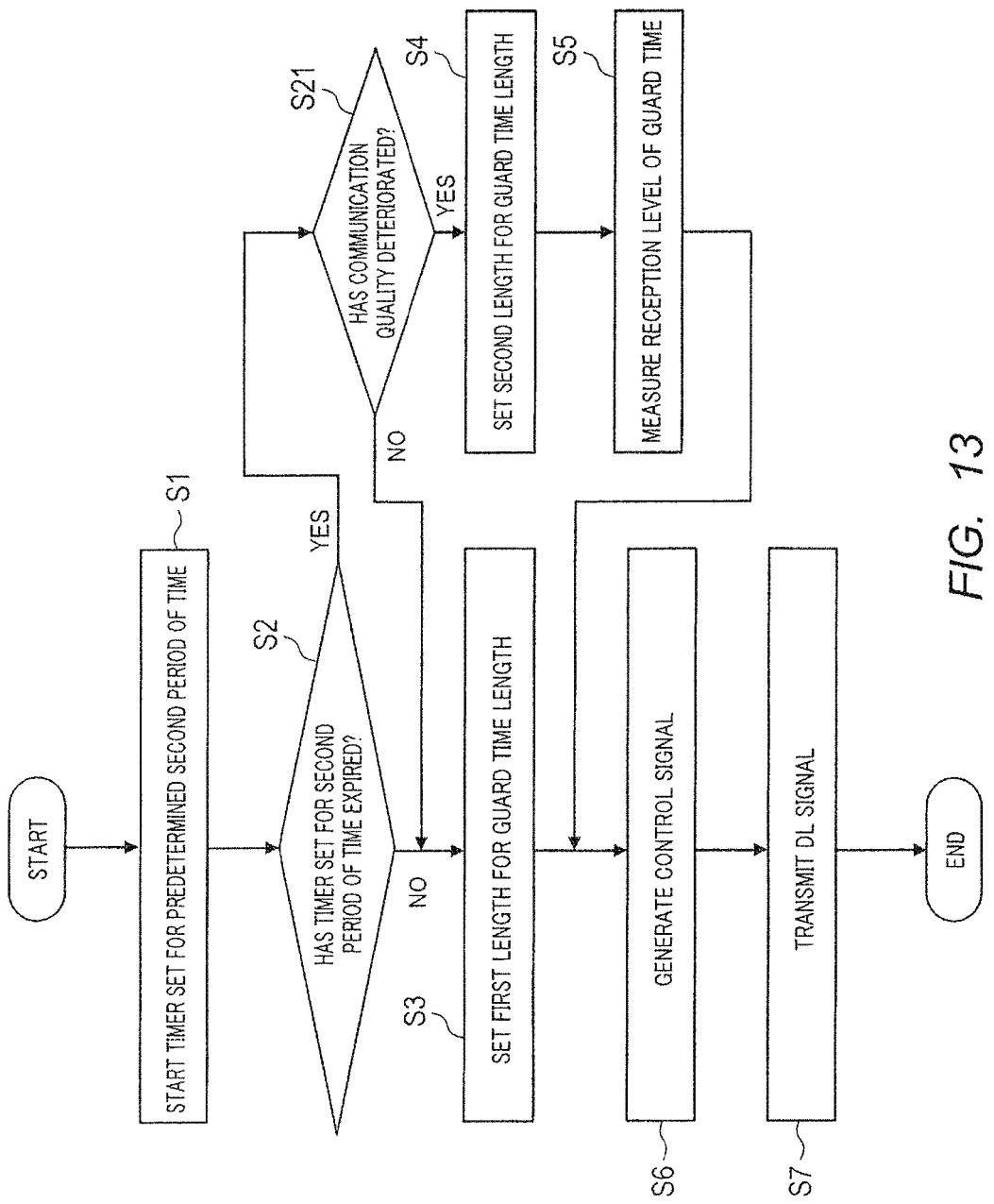
FIG. 13 is a flowchart illustrating an operation example of the base station according to Embodiment 3 of the present invention.

Next, a description will be given of an operation example of base station 200B according to Embodiment 3 with reference to FIG. 13. FIG. 13 is a flowchart illustrating the operation example of base station 200B according to Embodiment 3. Note that, in the flowchart illustrated in FIG. 13, the steps which are common to the flowchart illustrated in FIG. 5 are assigned the same reference numerals, and the detailed descriptions of the steps will not be repeated, hereinafter. The flowchart illustrated in FIG. 13 is different from the flowchart illustrated in FIG. 5 in that step S21 is added between steps S2 and S4.

In a case where the second period of time set for timer 206 has expired (step S2: YES) and the communication quality has deteriorated (step S21: YES), guard-time-length setting section 209 sets the second length for the length of a guard time of the subsequent frame (step S4). Meanwhile, in a case where the second period of time set for timer 206 has expired (step S2: YES) and the communication quality is favorable (step S21: NO), guard-time-length setting section 209 sets the first length for the length of a guard time of the subsequent frame (step S3).

The operation example of base station 200B according to Embodiment 3 has been described thus far.

As described above, the base station according to Embodiment 3 is characterized in that the base station sets the length of a guard time so as to secure a predetermined length required for measurement of the reception level in a case where it is time to measure the reception level of a guard time and the communication quality has deteriorated. Thus, in addition to the effects obtained in Embodiment 1, it is possible to achieve a further increase in the transmission rate as compared with Embodiment 1.

Embodiment 4

In Embodiment 2, a description has been given of the case where control signal generation section 214 stops generating a control signal and baseband transmission processing section 201 stops generating a frame and provides a guard time always at the interval of the second periods of time.

In Embodiment 4, a description will be given of a case where the communication quality is estimated in advance, and only when the communication quality has deteriorated, control signal generation section 214 stops generating a control signal and baseband transmission processing section 201 stops generating a frame and provides a guard time at the time when the second period of time passes. In Embodiment 4, the configuration of terminal 100 is the same as the configuration illustrated in FIG. 1, which is described in Embodiment 1, so that the description of the configuration will not be repeated, hereinafter.

Figure 14:
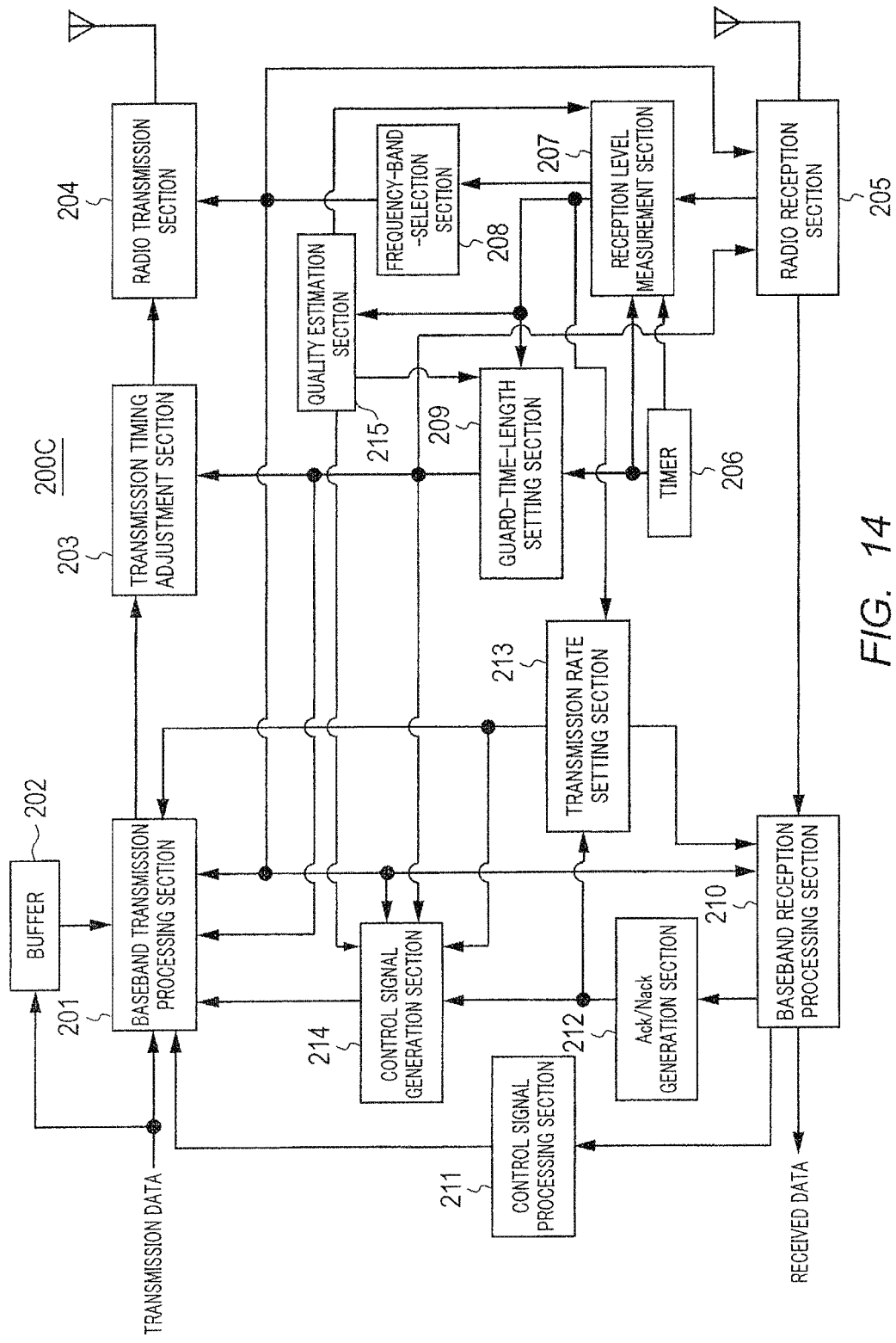
FIG. 14 is a block diagram illustrating a configuration example of a base station according to Embodiment 4 of the present invention.

A description will be given of a configuration example of base station 200C according to Embodiment 4 with reference to FIG. 14. FIG. 14 is a block diagram illustrating the configuration example of base station 200C according to Embodiment 4. Note that, in base station 200C illustrated in FIG. 14, the sections which are common to the sections of base station 200A illustrated in FIG. 6 are assigned the same reference numerals and the detailed descriptions of the sections will not be repeated, hereinafter. Base station 200C illustrated in FIG. 14 employs a configuration which is different from base station 200A illustrated in FIG. 6 in that quality estimation section 215 is added.

Upon reception of the first expiration signal from timer 206, reception level measurement section 207 measures the reception level of a UL signal (received signal). Reception level measurement section 207 outputs the information indicating the measured reception level of the UL signal to guard-time-length setting section 209, transmission rate setting section 213, and quality estimation section 215.

In addition, upon reception of the second expiration signal from timer 206, reception level measurement section 207 measures the reception level of a guard time only when the signal outputted from quality estimation section 215 indicates that the communication quality has deteriorated. Reception level measurement section 207 outputs the information indicating the measured reception level of the guard time to frequency-band-selection section 208.

Quality estimation section 215 makes a comparison of a magnitude relationship between the reception level of the UL signal measured by reception level measurement section 207 with a predetermined second threshold. Quality estimation section 215 estimates that the communication quality is favorable when the reception level is greater than the second threshold or estimates that the communication quality has deteriorated when the reception level is not greater than the second threshold. Quality estimation section 215 outputs a signal indicating a result of the estimation to reception level measurement section 207 and control signal generation section 214.

Upon reception of the second expiration signal from timer 206, control signal generation section 214 generates a control signal illustrated in FIG. 15 in the measurement target frequency band (first frequency band) of the current frame and outputs the control signal to baseband transmission processing section 201. The control signal illustrated in FIG. 15 is different from the control signal illustrated in FIG. 4 (guard-time-length information, frequency information, Ack/Nack, and link adaptation information) in that quality information which is a signal indicating an estimation result of quality estimation section 215 is added.

Control signal generation section 214 performs the same operation as that in Embodiment 2 in a frame other than the current frame transmitted when control signal generation section 214 receives the second expiration signal from timer 206.

Baseband transmission processing section 201 forms DL frames (DL31 and DL32 in FIGS. 16A and 16B) by inserting the control signal illustrated in FIG. 15 into transmission data in the current frame transmitted when the second period of time passes.

In a case where the quality information indicates that the communication quality is favorable, no guard time needs to be provided, so that terminal 100 transmits a UL signal in the portion of the frame where a guard time is supposed to be transmitted.

Figure 16A:
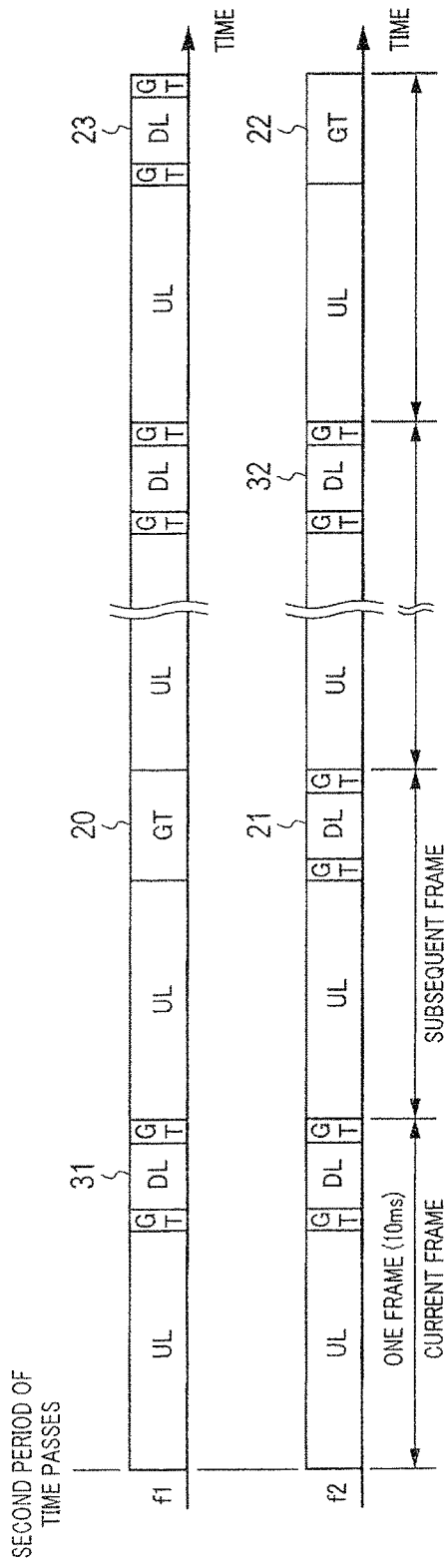
FIGS. 16A and 16B are each a diagram illustrating an example of a frame configuration according to Embodiment 4 of the present invention.
Figure 16B:
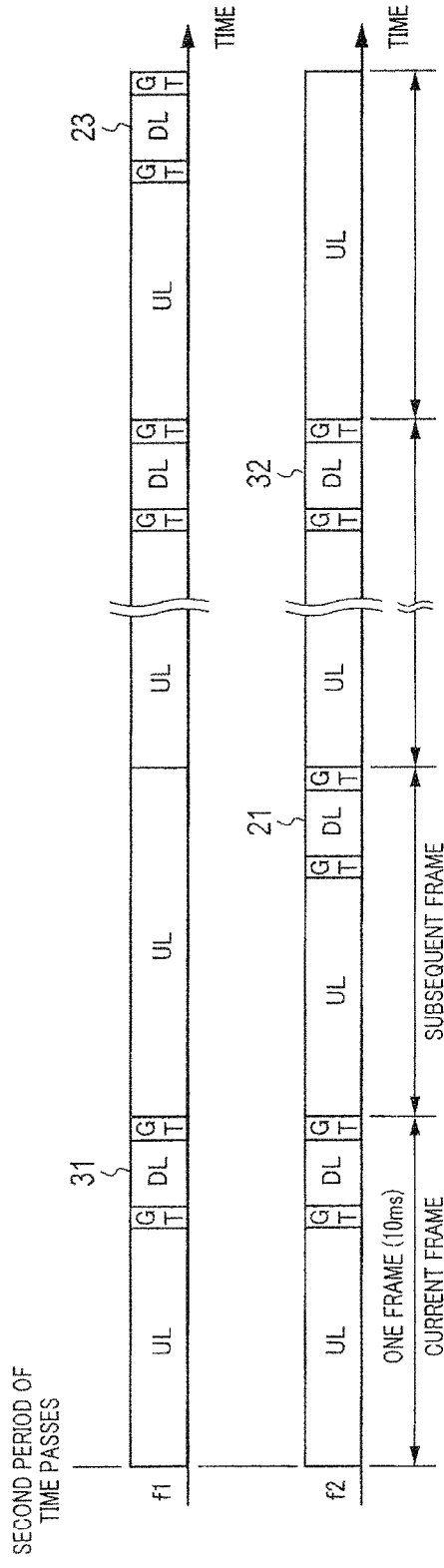

FIGS. 16A and 16B each illustrate an example of a frame configuration according to Embodiment 4. FIG. 16A illustrates a case where the communication quality has deteriorated, while FIG. 16B illustrates a case where the communication quality is favorable. Note that, an assumption is made that the length of one frame in the examples of FIGS. 16A and 16B is 10 ms.

As illustrated in FIG. 16A, in a case where the communication quality has deteriorated, no DL signal is transmitted in frequency band f1(f2) of the measurement target in the frame subsequent to the frame transmitted when the second period of time passes as in the case of Embodiment 2 (FIG. 8), and the portion of the frame where a DL signal would have been transmitted otherwise becomes guard time 20(22). Thus, a guard time longer than guard time 10 used for the normal period can be secured. Note that, in frequency band f2(f1) which is different from the measurement target frequency band, DL signal 21(23) is transmitted using the portion of the frame corresponding to guard time 20(22).

Meanwhile, as illustrated in FIG. 16B, in a case where the communication quality is favorable, no DL signal is transmitted in frequency band f1(f2) of the measurement target in the frame subsequent to the frame transmitted when the second period of time passes, and a UL signal is transmitted using the portion of the frame where a DL signal is supposed to be transmitted. Thus, it is made possible to increase the transmission period for the UL signal, thus making it possible to increase the transmission rate. Note that, DL signal 21(23) is transmitted in frequency band f2(f1) which is different from the measurement target frequency band.

The configuration example of base station 200C according to Embodiment 4 has been described thus far.

Figure 17:
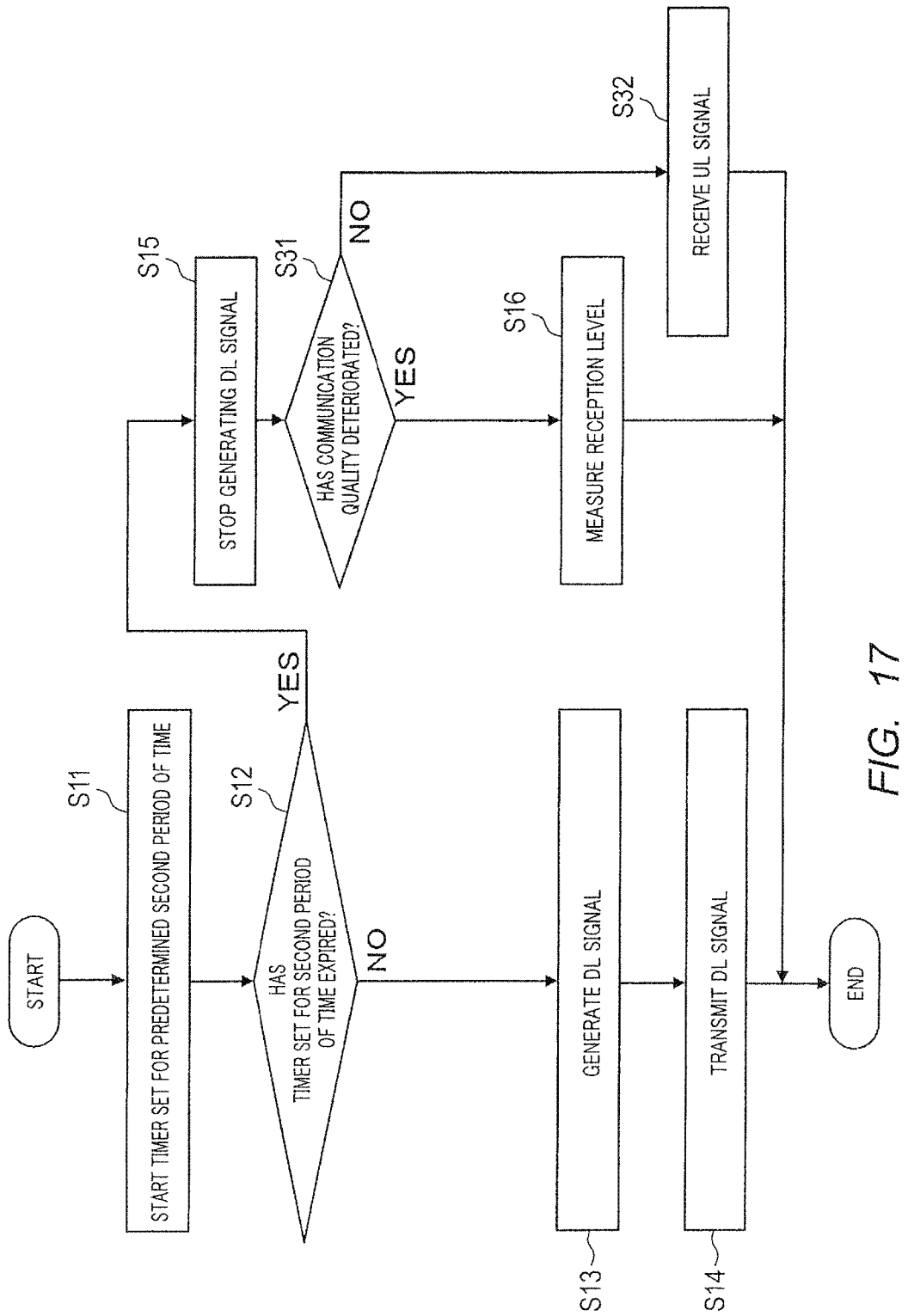
FIG. 17 is a flowchart illustrating an operation example of the base station according to Embodiment 4 of the present invention.

Next, a description will be given of an operation example of base station 200C according to Embodiment 4 with reference to FIG. 17. FIG. 17 is a flowchart illustrating the operation example of base station 200C according to Embodiment 4. Note that, in the flowchart illustrated in FIG. 17, the steps which are common to the flowchart illustrated in FIG. 9 are assigned the same reference numerals, and the detailed descriptions of the steps will not be repeated, hereinafter. The flowchart illustrated in FIG. 17 is different from the flowchart illustrated in FIG. 9 in that step S31 is added between steps S15 and S16 of the flow illustrated in FIG. 9 and that step S32 is added as a destination when a determination result in step S31 is NO.

In a case where the second period of time set for timer 206 has expired (step S12: YES), baseband transmission processing section 201 stops generating a DL signal in the frequency band (step S15). Meanwhile, in a case where the communication quality has deteriorated (step S31: YES), reception level measurement section 207 measures the reception level of the guard time of the frequency band (step S16).

Meanwhile, in a case where the communication quality is favorable (step S31: NO), base station 200C receives a UL signal (step S32). In this case, reception level measurement section 207 does not measure the reception level of the guard time of the frequency band.

The operation example of base station 200C according to Embodiment 4 has been described thus far.

As described above, the base station according to Embodiment 4 is characterized in that the base station secures, as a guard time, the period normally allocated for transmission of a DL frame, and includes information related to the measurement target frequency hand (first frequency band) in a control signal of another frequency band (second frequency band) in a case where it is time to measure the reception level of a guard time and the communication quality has deteriorated. Thus, in addition to the effects obtained in Embodiment 2, it is possible to achieve a further increase in the transmission rate as compared with Embodiment 2.

In Embodiment 4, in a frame in which a DL signal is transmitted in a certain frequency band (second frequency band), a UL signal may be transmitted in another frequency band (first frequency band) during a period other than a period in which measurement of the reception level is performed. An example of the frame configuration in this case is illustrated in FIGS. 18A and 18B. FIG. 18A illustrates a case where the communication quality has deteriorated, while FIG. 18B illustrates a case where the communication quality is favorable. As illustrated in FIGS. 18A and 18B, when a DL signal is transmitted in frequency band f1 during a period when it is not time to measure the reception level of a guard time (during the normal period), a UL signal is transmitted in frequency band f2 in the portion of the frame corresponding to the portion of the frame where the DL signal is transmitted in frequency band 1.

Embodiments of the present invention have been described thus far. The present invention is, however, not limited to these embodiments, and various modifications are possible.

For example, the same or mutually different modulation scheme to be used and/or error correction coding rate may be set for the frequency bands.

In the present invention, depending on the communication state or application or the like, it is possible to fixedly use the frame configuration illustrated in FIG. 16B or the frame configuration illustrated in FIG. 18B (configuration in which a control signal is transmitted from a frequency band other than the measurement target frequency band during a specific period such as a period when frequency sensing is performed). Even when the level of an interference wave is high, if the frequency bandwidth used by the interference wave is narrow, deterioration in characteristics due to the interference occurs only on partial data as long as the communication is multi-carrier communication such as OFDM. Thus, the deterioration in characteristics due to the interference wave can be reduced by frequency interleaving and error correction and/or the like. Accordingly, fixedly using the frame configuration illustrated in FIG. 16B or the frame configuration illustrated in FIG. 18B makes it possible to further improve the transmission efficiency depending on the communication state or application or the like.

INDUSTRIAL APPLICABILITY

The base station according to the present invention is applicable to a base station configured to perform radio communication with a terminal, for example.

REFERENCE SIGNS LIST

100 Terminal
101 Radio reception section
102 Baseband reception processing section
103 Ack/Nack generation section
104 Control signal generation section
105 Control signal processing section
106 Baseband transmission processing section
107 Buffer
108 Transmission timing adjustment section
109 Radio transmission section
200 Base station
201 Baseband transmission processing section
202 Buffer 203 Transmission timing adjustment section
204 Radio transmission section
205 Radio reception section
206 Timer
207 Reception level measurement section
208 Frequency-band-selection section
209 Guard-time-length setting section
210 Baseband reception processing section
211 Control signal processing section
212 Ack/Nack generation section
213 Transmission rate setting section
214 Control signal generation section
215 Quality estimation section

What is claimed is:

1. A base station configured to perform time-division duplex radio communication with a terminal, using part of a frequency band shared with another system, the base station comprising:
   a receiver that receives an uplink signal from the terminal for each frequency band in use;
   a guard-time-length setter that sets a length of a guard time;
   a reception level measurer that measures, for the frequency band in use, a reception level of the uplink signal and a reception level of the guard time having a predetermined length;
   a frequency band selector that selects a frequency band in which the reception level of the guard time is not greater than a first threshold;
   a control signal generator that generates, for the frequency band in use, a control signal including information indicating the set length of the guard time, and information indicating the selected frequency band; and
   a transmitter that transmits a downlink signal including the control signal to the terminal for the frequency band in use,
   wherein the guard-time-length setter sets a first length for the guard time based on the reception level of the uplink signal during a period until a timer that is set for a predetermined period of time expires, and the guard-time-length setter sets a second length for the guard time when the timer that is set for the predetermined period of time has expired, the second length being longer than the first length.

2. The base station according to claim 1, further comprising:
   a quality estimator that estimates channel quality by comparing the reception level of the uplink signal with a second threshold,
   wherein the guard-time-length setter sets the first length for the guard time in a case where the reception level of the uplink signal is not greater than the second threshold, even when the timer that is set for the predetermined period of time has expired.

* * * * *